US008775013B1

(12) United States Patent
Smailus

(10) Patent No.: US 8,775,013 B1
(45) Date of Patent: Jul. 8, 2014

(54) SYSTEM AND METHOD FOR ACOUSTIC SIGNATURE HEALTH MONITORING OF UNMANNED AUTONOMOUS VEHICLES (UAVS)

(71) Applicant: The Boeing Company, Chicago, IL (US)

(72) Inventor: Thomas O. Smailus, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/867,027

(22) Filed: Apr. 19, 2013

(51) Int. Cl.
*G01M 17/00* (2006.01)
*B64C 13/20* (2006.01)

(52) U.S. Cl.
USPC .......................................... 701/31.4; 244/190

(58) Field of Classification Search
CPC ........... B64C 2201/146; B64C 39/024; G05D 1/0022; G05D 1/0291; G05D 1/104; G05D 1/0038; G07C 5/008; G07C 5/0866; G08G 5/0039; G08G 5/0069; G08G 5/0086; G01N 2021/1704; G01N 2021/3595; G01N 21/1702; G01N 2201/02
USPC ........... 701/24, 25, 26, 29; 348/144; 180/167, 180/168; 700/245, 264; 244/189, 190, 10
See application file for complete search history.

(56) References Cited

U.S. PATENT DOCUMENTS

| 2007/0284474 | A1* | 12/2007 | Olson et al. ...................... 244/10 |
| 2010/0224732 | A1* | 9/2010 | Olson et al. ................... 244/190 |
| 2010/0268409 | A1* | 10/2010 | Vian et al. ....................... 701/24 |

OTHER PUBLICATIONS

Potocnik, et al., "Application of Psychoacoustic Filtering for Machine Fault Detection", The 8th International Conference of the Slovenian Society for Non-Destructive Testing, Sep. 1-3, 2005, Portoroz, Slovenia, pp. 293-298.*
Clifton, David, "Condition Monitoring of Gas-Turbine Engines", St. Cross College, Department of Engineering Science, University of Oxford, Jan. 2006, 60 pages.
Meegan, et al., "Fault Detection in Engines Through Higher Order Spectral Analysis of Acoustic Signatures", Acoustics Research Letters Online, Published Online May 18, 1999, pp. L1-L6.
Miljkovic, Dubravko, "Fault Detection for Aircraft Piston Engine by Exhaust Noise Analysis," MIPRO, May 23-27, 2011, Opatija, Croatia, pp. 756-761.
Stambler, Irwin, "Early Warning Detection to Prevent Combustor Failures", Gas Turbine World, Jul.-Aug. 2009, 4 pages.

* cited by examiner

*Primary Examiner* — Muhammad Shafi

(57) ABSTRACT

There is provided a method and system for acoustic signature health monitoring of an unmanned autonomous vehicle (UAV). The method positions an acoustic signature health monitoring system proximate to and off-board a UAV to be monitored for mechanical health of one or more sound producing structures. The method obtains and analyzes with the system a baseline acoustic signature for each of the sound producing structures, and transmits each baseline acoustic signature to a data processing system for processing. The method obtains and analyzes one or more subsequent acoustic signatures for each of the sound producing structures, and transmits the one or more subsequent acoustic signatures to the data processing system. The method compares the processed baseline acoustic signature with the one or more processed subsequent acoustic signatures for the sound producing structures, in order to detect any change in the processed baseline acoustic signature over time.

20 Claims, 7 Drawing Sheets

SYSTEM AND METHOD FOR ACOUSTIC SIGNATURE HEALTH MONITORING OF UNMANNED AUTONOMOUS VEHICLES (UAVS)

BACKGROUND

1) Field of the Disclosure

The disclosure relates generally to systems and methods for health monitoring of unmanned autonomous vehicles (UAVs), and more particularly, to systems and methods for acoustic signature health monitoring of unmanned autonomous vehicles (UAVs), such as unmanned air vehicles.

2) Description of Related Art

Air vehicle health monitoring systems and methods are commonly used to detect faults and to assess the operational health of various systems and structures of air vehicles, for example, air vehicles such as commercial aircraft, military aircraft, rotorcraft, and other air vehicles. Such health monitoring systems and methods may use sensors to continuously monitor various sensory signals, such as acoustic, vibration, force, and temperature signals, and to generate data that may be used to warn of any possible problems so that preventive maintenance action may be taken.

Known health monitoring sensor systems installed onboard air vehicles and powered by equipment onboard the air vehicles exist. However, such known onboard health monitoring sensor systems may include additional components and equipment that may add weight to the air vehicles, which, in turn, may result in an increased fuel requirement for a given flight profile. This increased fuel requirement may, in turn, result in increased fuel costs. Moreover, such known onboard health monitoring sensor systems may prove challenging for use with unmanned autonomous vehicles (UAVs), such as unmanned air vehicles, which may typically be lighter in weight than manned air vehicles and which may have limited onboard space. Further, installing such known health monitoring sensor systems onboard air vehicles may require modifications to the air vehicles. Such modifications to the air vehicles may require additional licenses, certifications, and/or government approvals for any new equipment or components which may be costly and time consuming to obtain.

Accordingly, there is a need in the art for an improved system and method for acoustic signature health monitoring of UAVs that provide advantages over known systems and methods for health monitoring of air vehicles.

SUMMARY

This need for an improved system and method for acoustic signature health monitoring of UAVs is satisfied by this disclosure. As discussed in the below detailed description, embodiments of the improved system and method for acoustic signature health monitoring of UAVs may provide significant advantages over existing systems and methods.

In an embodiment of the disclosure, there is provided a method for acoustic signature health monitoring of an unmanned autonomous vehicle (UAV). The method comprises the step of positioning an acoustic signature health monitoring system proximate to and off-board an unmanned autonomous vehicle (UAV) to be monitored for mechanical health of one or more sound producing structures of the UAV. The method further comprises the step of obtaining and analyzing with the acoustic signature health monitoring system off-board the UAV a baseline acoustic signature for each of the one or more sound producing structures of the UAV. The method further comprises the step of transmitting with the acoustic signature health monitoring system each baseline acoustic signature to a data processing system for processing. The method further comprises the step of obtaining and analyzing with the acoustic signature health monitoring system off-board the UAV one or more subsequent acoustic signatures for each of the one or more sound producing structures of the UAV. The method further comprises the step of transmitting with the acoustic signature health monitoring system each of the one or more subsequent acoustic signatures to the data processing system for processing. The method further comprises the step of comparing the processed baseline acoustic signature with the one or more processed subsequent acoustic signatures for each of the one or more sound producing structures of the UAV, in order to detect any change in the processed baseline acoustic signature over time.

In another embodiment of the disclosure, there is provided a system for health monitoring of an unmanned autonomous vehicle (UAV). The system comprises an acoustic signature health monitoring system off-board an unmanned autonomous vehicle (UAV). The acoustic signature health monitoring system comprises an acoustic signature capture and monitoring subsystem configured to capture a baseline acoustic signature and one or more subsequent acoustic signatures for one or more sound producing structures of the UAV. The acoustic signature health monitoring system further comprises an analysis subsystem configured to analyze and transmit the baseline acoustic signature and the one or more subsequent acoustic signatures. The acoustic signature health monitoring system further comprises a power source providing power to the acoustic signature capture and monitoring subsystem and the analysis subsystem. The system further comprises a data processing system comprising a computing device configured to receive and process the baseline acoustic signature and the one or more subsequent acoustic signatures to obtain a processed baseline acoustic signature and one or more processed subsequent acoustic signatures. The data processing system compares the processed baseline acoustic signature with the one or more processed subsequent acoustic signatures for each of the one or more sound producing structures of the UAV to detect any change in the processed baseline acoustic signature over time, in order to identify any defects and monitor a mechanical health of the one or more sound producing structures of the UAV.

In another embodiment of the disclosure, there is provided an acoustic signature health monitoring system off-board an unmanned autonomous vehicle (UAV). The acoustic signature health monitoring system comprises an acoustic signature capture and monitoring subsystem configured to capture a baseline acoustic signature and configured to capture one or more subsequent acoustic signatures, for one or more sound producing structures of an unmanned autonomous vehicle (UAV). The acoustic signature capture and monitoring subsystem comprises one or more microphones and one or more audio recording devices. The acoustic signature health monitoring system further comprises an analysis subsystem comprising an analysis subsystem computing device configured to analyze and transmit the baseline acoustic signature and the one or more subsequent acoustic signatures to a data processing system for processing to obtain a processed baseline acoustic signature and one or more processed subsequent acoustic signatures. The data processing system compares the processed baseline acoustic signature with the one or more processed subsequent acoustic signatures for each of the one or more sound producing structures of the UAV to detect any change in the processed baseline acoustic signature over time, in order to identify any defects and monitor a mechanical health of the one or more sound producing structures of the UAV. The acoustic signature health monitoring system further comprises a power source providing power to the acoustic signature capture and monitoring subsystem and the analysis subsystem.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Embodiments of the disclosure discussed in detail below provide a method 70 (see FIG. 5) for acoustic signature health monitoring of an unmanned autonomous vehicle (UAV) 10b (see FIGS. 2, 8), and provide a system 68 (see FIG. 8) for health monitoring of UAVs using acoustic signatures 112 (see FIG. 8). Preferably, the method 70 and system 68 are automated. As used herein, the term "acoustic signature" means a series of noises or sounds generated by sound producing structures in a vehicle, such as an unmanned autonomous vehicle (UAV), where the sound producing structures include sound producing mechanical structures, such as engines, a propellers, fuel pumps, rotors, air conditioning systems, or other sound producing structures, and where the generated noises or sounds are captured or recorded, analyzed, and processed using known acoustic analysis techniques or processes.

Figure 1:
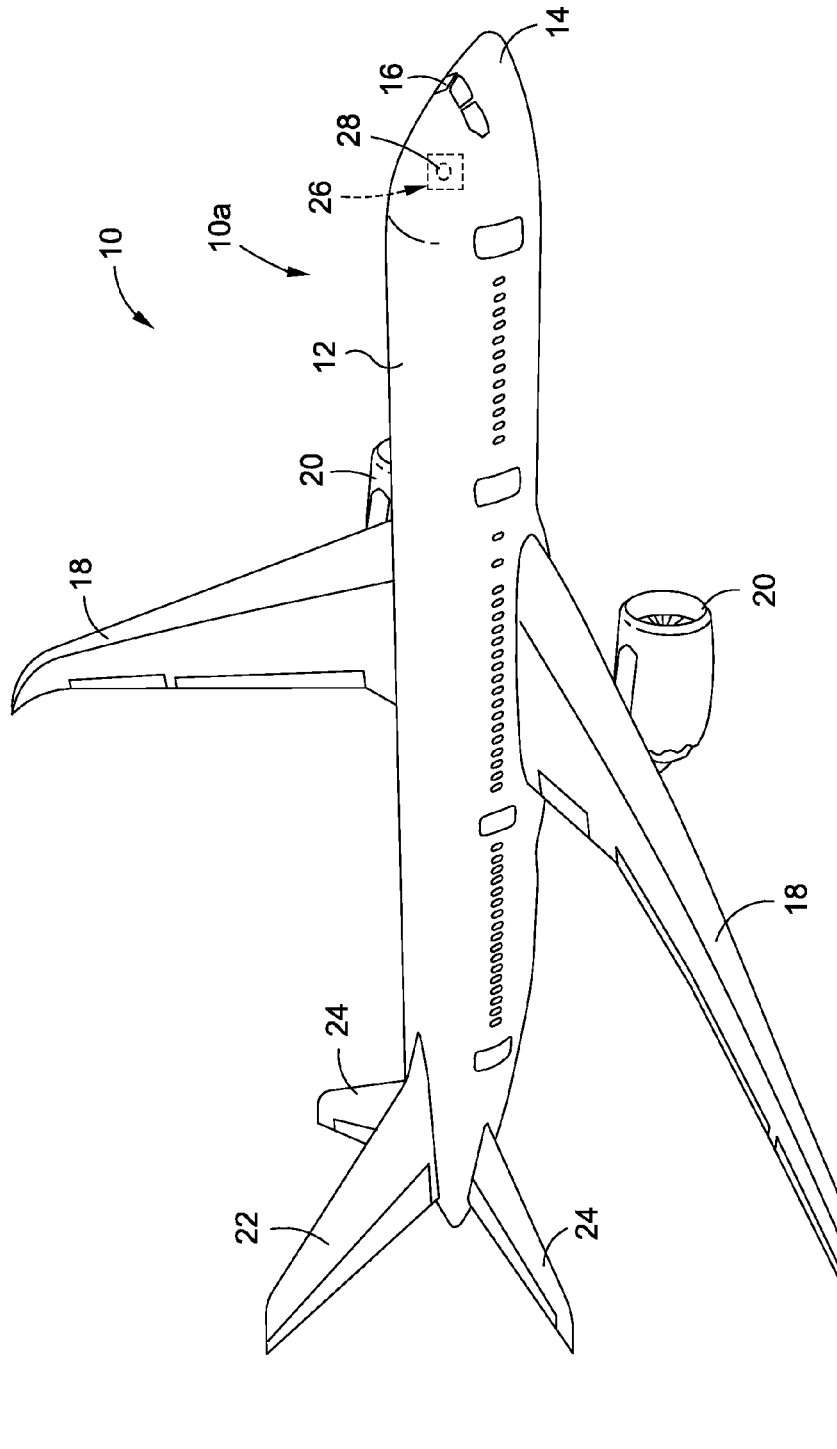
FIG. 1 is an illustration of a perspective view of a known manned air vehicle.

Now referring to the Figures, FIG. 1 is an illustration of a perspective view of a known air vehicle 10, such as in the form of a manned air vehicle 10a. As shown in FIG. 1, the air vehicle 10, such as in the form of manned air vehicle 10a, comprises a fuselage 12, a nose 14, a cockpit area 16, wings 18, engines 20, a vertical stabilizer tail portion 22, and horizontal stabilizer tail portions 24. As further shown in FIG. 1, the air vehicle 10, such as in the form of manned air vehicle 10a, comprises an onboard maintenance system 26 having a maintenance system log 28 for recording and maintaining information and data regarding the health maintenance of the air vehicle 10.

Figure 2:
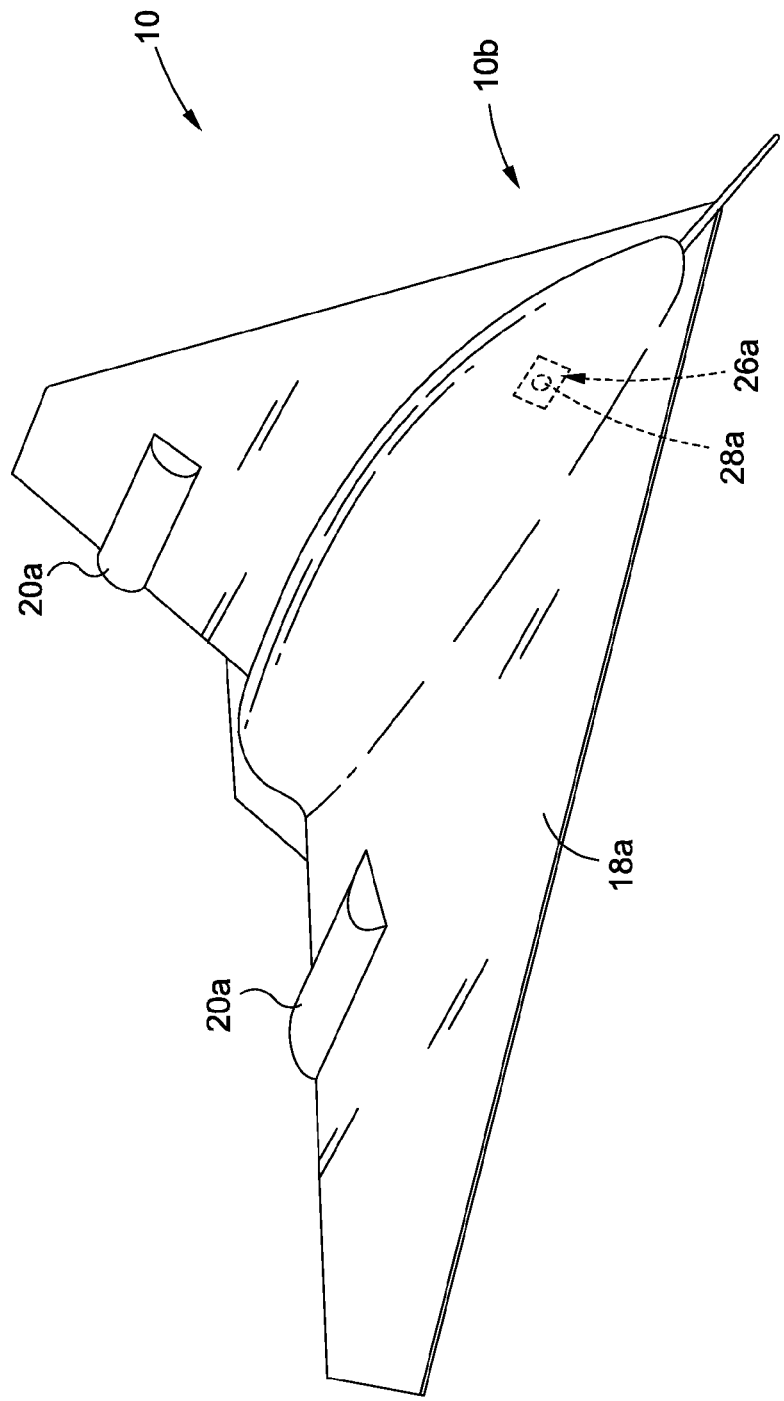
FIG. 2 is an illustration of a perspective view of an example of an unmanned autonomous vehicle (UAV)

FIG. 2 is an illustration of a perspective view of a known air vehicle 10, such as in the form of an unmanned autonomous vehicle (UAV) 10b. As shown in FIG. 2, the UAV 10b comprises wings 18a, engines 20a, and the onboard maintenance system 26a having the maintenance system log 28a. The embodiments of the method 70 (see FIG. 5) and the system 68 (see FIG. 8) disclosed herein are preferably applied to UAVs 10b (see FIG. 2), such as unmanned air vehicles, drones, or unmanned combat air vehicles. Further, embodiments of the method 70 (see FIG. 5) and the system 68 (see FIG. 8) may be used to test new UAVs 11a (see FIG. 8) at a factory, as well as used UAVs 11b (see FIG. 8) already in operation. As used herein, "unmanned autonomous vehicle" means a vehicle without a person on board that may be either remotely controlled, remotely guided, or autonomous, such as capable of sensing the environment and navigating on its own.

Figure 3:
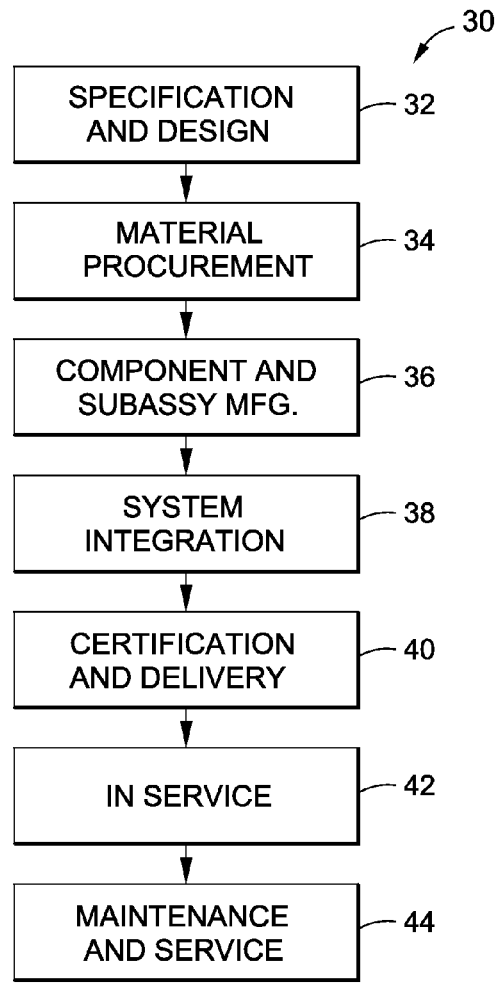
FIG. 3 is a flow diagram of aircraft production and service methodology.
Figure 4:
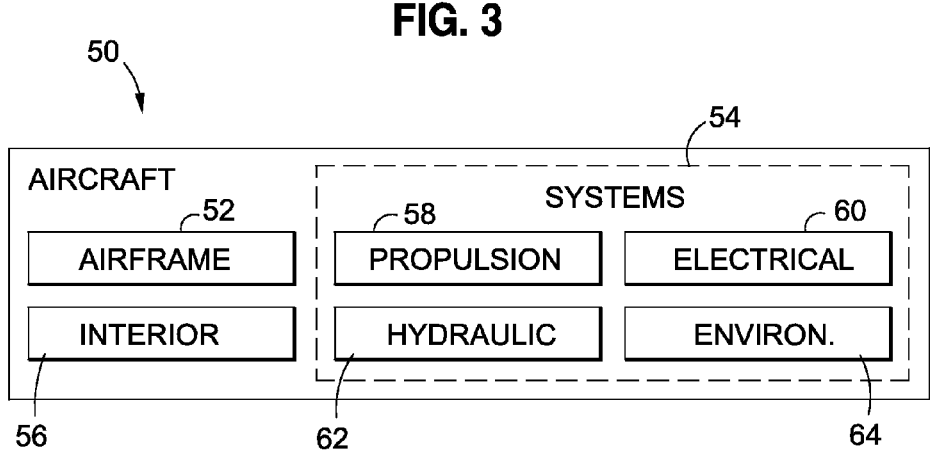
FIG. 4 is a block diagram of an aircraft.

FIG. 3 is an illustration of a flow diagram of an aircraft manufacturing and service method 30. FIG. 4 is an illustration of a block diagram of an aircraft 50. The same or a reduced set of FIG. 3 and FIG. 4 may apply to UAVs. Referring to FIGS. 3-4, embodiments of the disclosure may be described in the context of the aircraft manufacturing and service method 30 as shown in FIG. 3 and the aircraft 50 as shown in FIG. 4. During pre-production, exemplary aircraft manufacturing and service method 30 may include specification and design 32 of the aircraft 50 and material procurement 34. During manufacturing, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 may be scheduled for routine maintenance and service 44 (which may also include modification, reconfiguration, refurbishment, and other suitable services).

Each of the processes of the aircraft manufacturing and service method 30 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 4, the aircraft 50 produced by the exemplary aircraft manufacturing and service method 30 may include an airframe 52 with a plurality of systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the invention may be applied to other industries, such as the automotive industry.

Methods and systems embodied herein may be employed during any one or more of the stages of the aircraft manufacturing and service method 30. For example, components or subassemblies corresponding to component and subassembly manufacturing 36 may be fabricated or manufactured in a manner similar to components or subassemblies produced while the aircraft 50 is in service. Also, one or more apparatus embodiments, method embodiments, or a combination thereof, may be utilized during component and subassembly manufacturing 36 and system integration 38, for example, by substantially expediting assembly of or reducing the cost of the aircraft 50. Similarly, one or more of apparatus embodiments, method embodiments, or a combination thereof, may be utilized while the aircraft 50 is in service, for example and without limitation, to maintenance and service 44.

Figure 5:
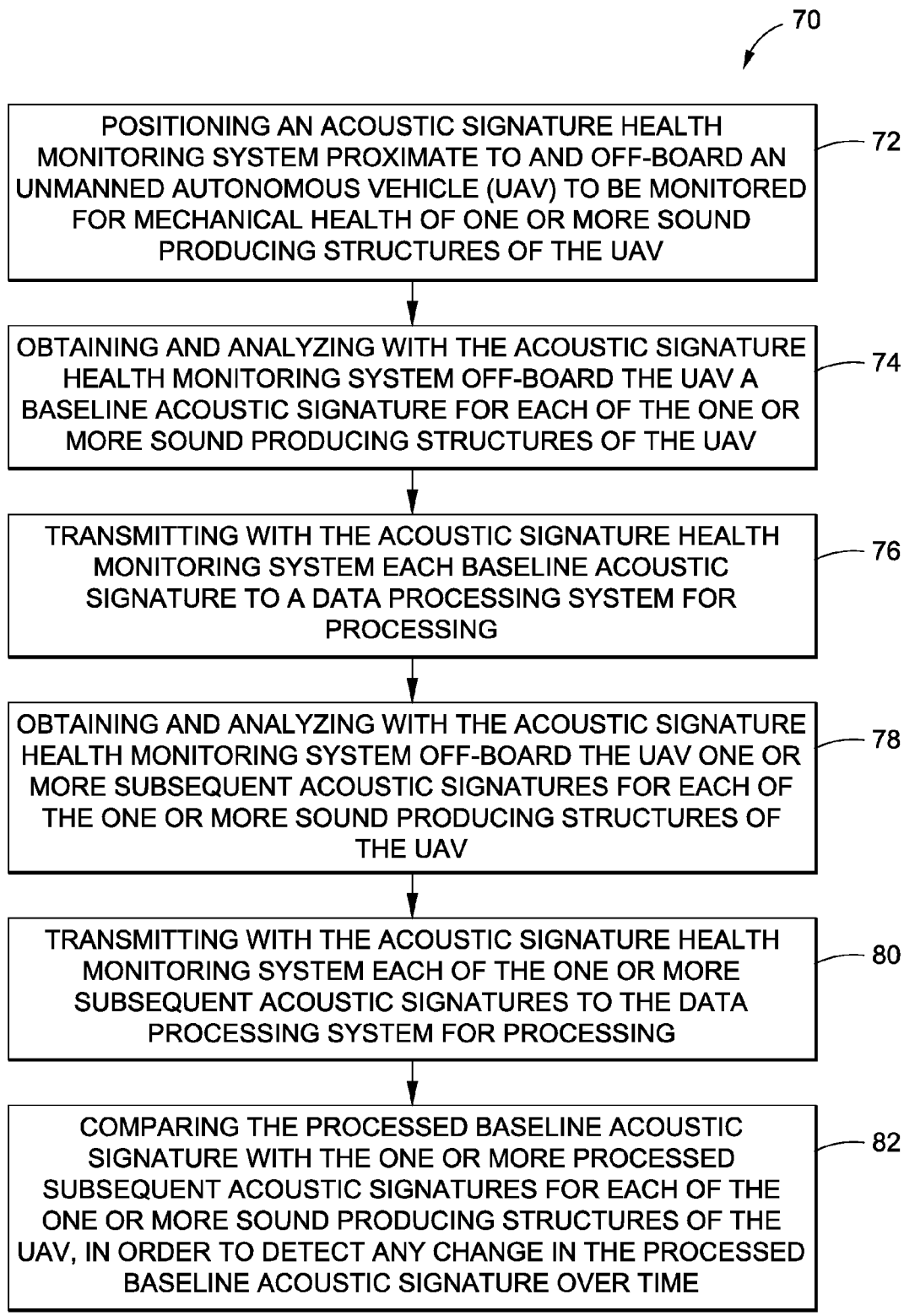
FIG. 5 is an illustration of a flow diagram illustrating one of the embodiments of a method of the disclosure.
Figure 8:
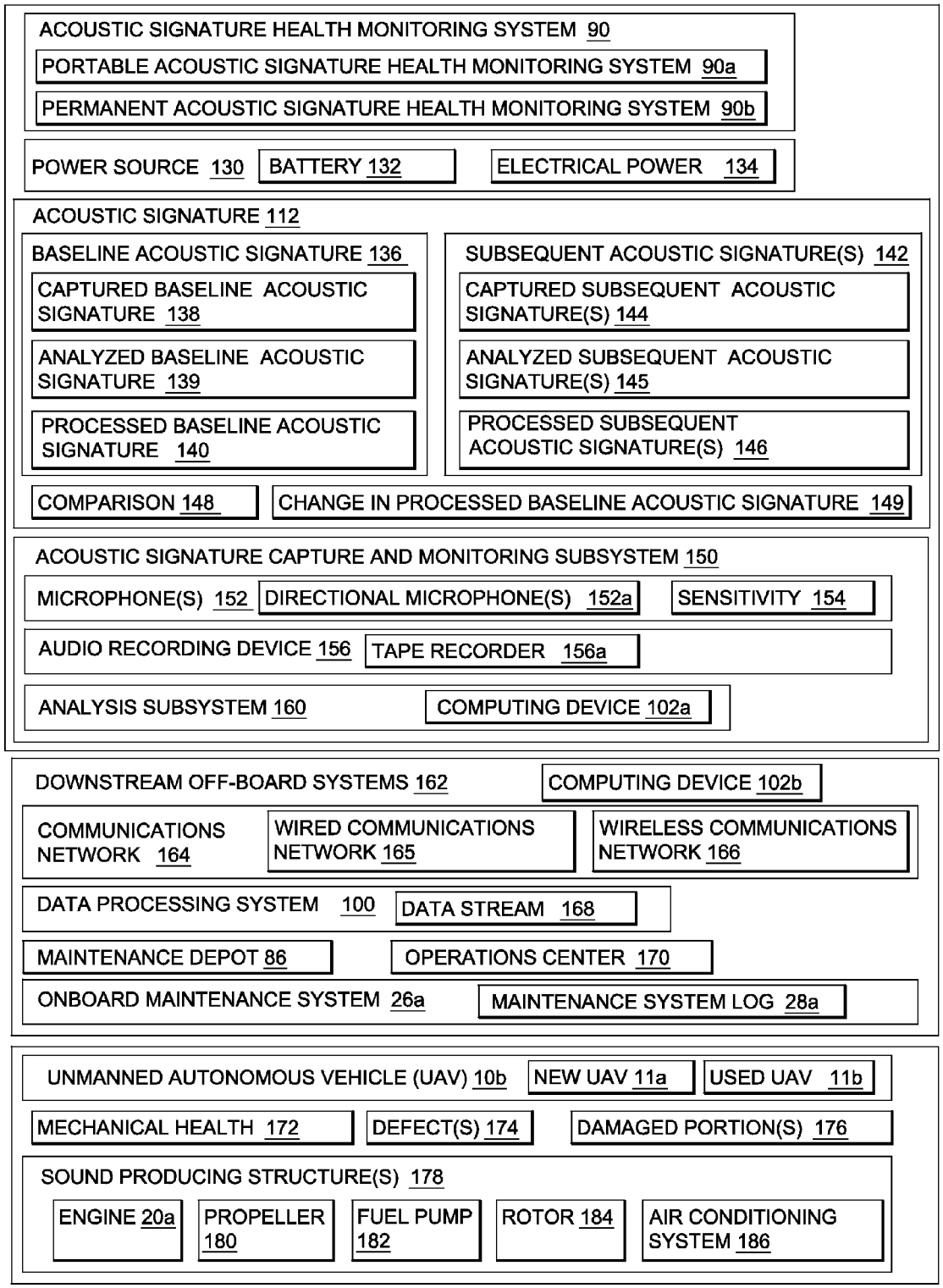

In an embodiment of the disclosure, there is provided a method 70 for acoustic signature health monitoring of an unmanned autonomous vehicle (UAV) 10b (see FIGS. 2, 8). FIG. 5 is an illustration of a flow diagram illustrating one of the embodiments of the method 70 of the disclosure.

As shown in FIG. 5, the method 70 comprises step 72 of positioning an acoustic signature health monitoring system 90 (see FIG. 8) proximate to and off-board an unmanned autonomous vehicle (UAV) 10b (see FIGS. 2, 8) to be monitored for mechanical health 172 (see FIG. 8) of one or more sound producing structures 178 (see FIG. 8) of the UAV 10b (see FIGS. 2, 8). The sound producing structures 178 (see FIG. 8) of the UAV 10b (see FIGS. 2, 8) may comprise an engine 20a (see FIGS. 2, 8), a propeller 180 (see FIG. 8), a fuel pump 182 (see FIG. 8), a rotor 184 (see FIG. 8), an air conditioning system 186 (see FIG. 8), or another sound producing structure 178. For example, in an engine 20a (see FIGS. 2, 8), an analysis of the acoustic signature 112 (see FIG. 8) may reveal developing problems with the rotating components or combustion system. For other motors and gears on a UAV 10b, unusual sounds in the operation of electrical motors may indicate issues with linkages or the motors themselves.

As shown in FIG. 8, the acoustic signature health monitoring system 90 comprises an acoustic signature capture and monitoring subsystem 150 that is preferably configured to capture a baseline acoustic signature 136 for the one or more sound producing structures 178 of the UAV 10b, to obtain a captured baseline acoustic signature 138 (see FIG. 8). The acoustic signature capture and monitoring subsystem 150 is further preferably configured to capture one or more subsequent acoustic signatures 142 for the one or more sound producing structures 178 of the UAV 10b, to obtain one or more captured subsequent acoustic signatures 144 (see FIG. 8). Each baseline acoustic signature 136 has a corresponding one or more subsequent acoustic signatures 142.

As shown in FIG. 8, the acoustic signature capture and monitoring subsystem 150 comprises one or more microphones 152, such as in the form of one or more directional microphone(s) 152a, or other suitable microphones. In one embodiment, multiple microphones 152 may be positioned in an array configuration proximate to the UAV 10b (see FIG. 2). Preferably, the one or more microphones 152 may be unidirectional and designed to receive sound from one direction. However, the one or more microphones 152 may also be bidirectional or omnidirectional in some cases. Preferably, the one or more microphones 152 have a sensitivity 154 (see FIG. 8) sufficient to capture audio data or sounds from the sound producing structure(s) 178 of the UAV 10b at a proximate distance from the UAV 10b.

As shown in FIG. 8, the acoustic signature capture and monitoring subsystem 150 further comprises one or more audio recording devices 156, such as in the form of a tape recorder 156a, or another suitable audio recording device. The acoustic signature capture and monitoring subsystem 150 (see FIG. 8) is preferably configured to capture and record the baseline acoustic signature 136 (see FIG. 8) and is preferably configured to capture and record the one or more subsequent acoustic signatures 142 (see FIG. 8).

As shown in FIG. 8, the acoustic signature health monitoring system 90 further comprises an analysis subsystem 160. The analysis subsystem 160 preferably comprises a computing device 102 (see FIG. 7), such as an analysis subsystem computing device 102a (see FIG. 8). The computing device 102 (see FIG. 8) of the analysis subsystem 160 (see FIG. 8) is preferably configured to analyze the captured baseline acoustic signature 138 to obtain an analyzed baseline acoustic signature 139 (see FIG. 8). The computing device 102 (see FIG. 8) of the analysis subsystem 160 (see FIG. 8) is preferably further configured to analyze the one or more captured subsequent acoustic signatures 144 to obtain one or more analyzed subsequent acoustic signatures 145 (see FIG. 8). The computing device 102 (see FIG. 8) of the analysis subsystem 160 (see FIG. 8) is preferably configured to transmit the analyzed baseline acoustic signature 139 (see FIG. 8) to a data processing system (see FIG. 8), and is preferably further configured to transmit the one or more analyzed subsequent acoustic signatures 145 (see FIG. 8) to the data processing system 100 (see FIG. 8).

Figure 7:
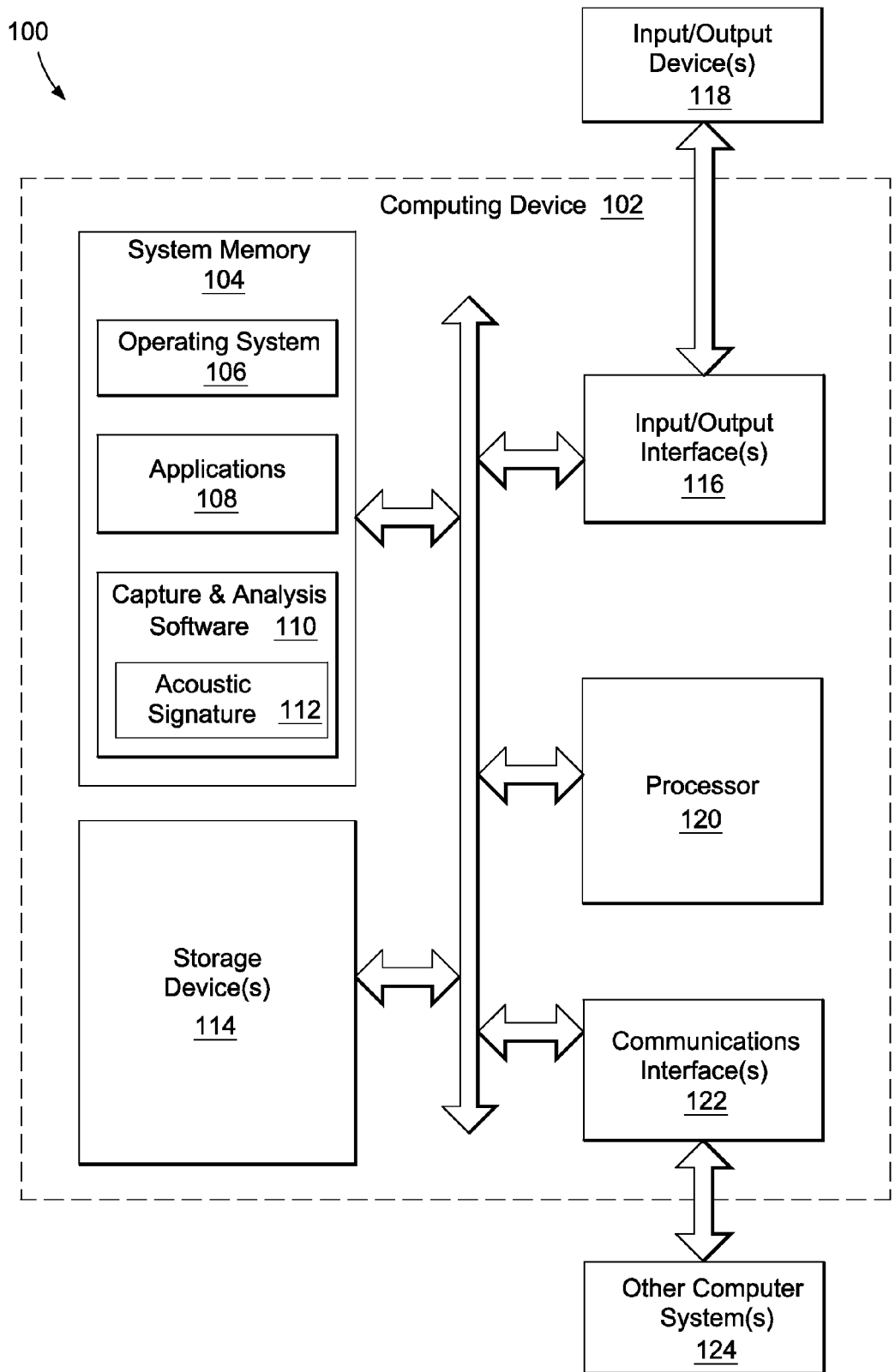
FIG. 7 is an illustration of a block diagram of a computing device that may be used with embodiments of a system and a method of the disclosure; and, FIG. 8 is an illustration of a block diagram illustrating an embodiment of a system of the disclosure.

FIG. 7 is an illustration of a block diagram of a computing device 102 that may be used with an embodiment of the acoustic signature health monitoring system 90 of the disclosure. As shown in FIG. 7, the computing device 102 comprises a system memory 104, an operating system 106, a plurality of applications 108, capture and analysis software 110 for analyzing the acoustic signature 112, and one or more storage devices(s) 114. As shown in FIG. 7, the computing device 102 further comprises input/output interfaces(s) 116 that interface with corresponding input/output device(s) 118, a processor 120, and communications interface(s) 122 that interface with corresponding other computer system(s) 124.

As shown in FIG. 8, the acoustic signature health monitoring system 90 further comprises a power source 130 that provides power to the acoustic signature capture and monitoring subsystem 150 and to the analysis subsystem 160. The power source 130 may comprise a battery 132 (see FIG. 8), if, for example, the acoustic signature health monitoring system 90 is in the form of a portable acoustic signature health monitoring system 90a (see FIG. 8). The power source 130 may comprise electrical power 134 (see FIG. 8), if, for example, the acoustic signature health monitoring system 90 is in the form of a permanent acoustic signature health monitoring system 90b (see FIG. 8) permanently installed at a dedicated location or site.

Figure 6:
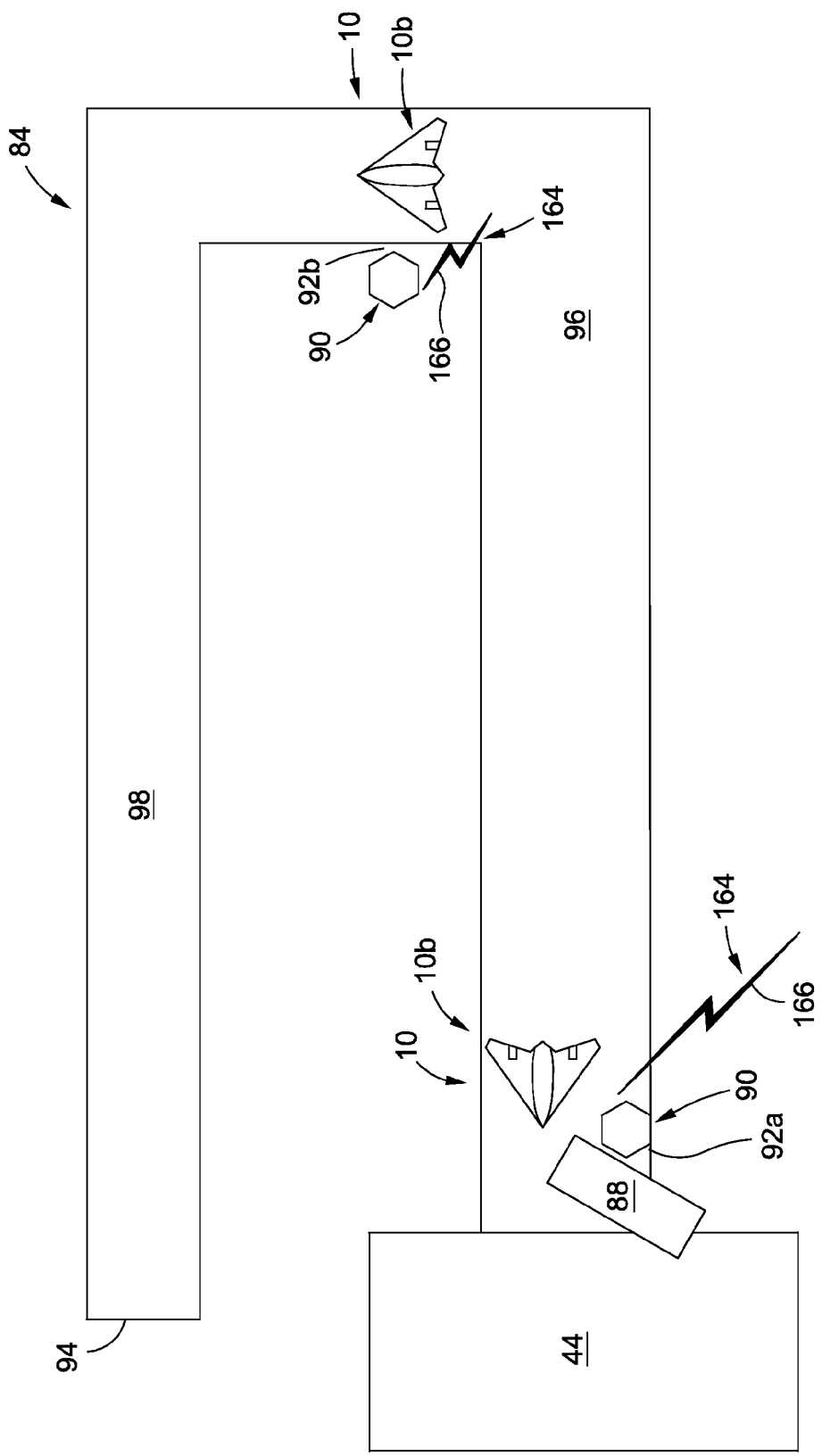
FIG. 6 is an illustration of a schematic diagram of an in-field set-up of embodiments of an acoustic signature health monitoring system of the disclosure.

The step 72 of positioning the acoustic signature health monitoring system 90 further comprises positioning one or more of the acoustic signature health monitoring systems 90 (see FIG. 6) proximate to, and off-board the UAV 10b (see FIG. 6), at a desired location. FIG. 6 is an illustration of a schematic diagram of an in-field set-up 84 of embodiments of the acoustic signature health monitoring system 90 of the disclosure. As shown in FIG. 6, one acoustic signature health monitoring system 90 is positioned at a first desired location 92a near the UAV 10b and near a maintenance depot 88. As further shown in FIG. 6, another acoustic signature health monitoring system 90 is positioned at a second desired location 92b near where the UAV 10b passes the acoustic signature health monitoring system 90 on a taxiway 96. Preferably, the desired location is one where the UAV 10b passes by the acoustic signature health monitoring system 90 at a distance sufficient for the acoustic signature health monitoring system 90 (see FIG. 6) to capture the baseline acoustic signature 136 (see FIG. 8) and to capture the one or more subsequent acoustic signatures 142 (see FIG. 8). More preferably, the desired location for positioning one or more of the acoustic signature health monitoring systems 90 may comprise one of a launch site 94 (see FIG. 6), a taxiway 96 (see FIG. 6), a runway 98 (see FIG. 6), an air strip (not shown), a landing strip (not shown), an operations center 86 (see FIG. 6), a maintenance depot 88 (see FIG. 6), a factory (not shown), or another suitable location.

The step 72 of positioning the acoustic signature health monitoring system 90 further comprises positioning a portable acoustic signature health monitoring system 90a (see FIG. 8), or, alternatively, positioning a permanent acoustic signature health monitoring system 90b (see FIG. 8), at the desired location.

As shown in FIG. 5, the method 70 further comprises step 74 of obtaining and analyzing with the acoustic signature health monitoring system 90 (see FIG. 8) off-board the UAV 10b (see FIG. 8), the baseline acoustic signature 136 (see FIG. 8) for each of the one or more sound producing structures 178 (see FIG. 8) of the UAV 10b (see FIG. 8). The step 74 of obtaining and analyzing the baseline acoustic signature 136 (see FIG. 8) for each of the one or more sound producing structures 178 (see FIG. 8) of the UAV 10b (see FIG. 8) preferably comprises using the acoustic signature capture and monitoring subsystem 150 (see FIG. 8) and the analysis subsystem 160 (see FIG. 8), both of the acoustic signature health monitoring system 90 (see FIG. 8). As discussed above, the acoustic signature capture and monitoring subsystem 150 (see FIG. 8) is preferably configured to capture the baseline acoustic signature 136 for the one or more sound producing structures 178 of the UAV 10b to obtain the captured baseline acoustic signature 138 (see FIG. 8). As discussed above, the analysis subsystem 160 (see FIG. 8) is preferably configured to analyze the captured baseline acoustic signature 138 to obtain the analyzed baseline acoustic signature 139 (see FIG. 8).

As shown in FIG. 5, the method 70 further comprises step 76 of transmitting with the acoustic signature health monitoring system 90 (see FIG. 8) each baseline acoustic signature 136 (see FIG. 8), such as in the form of the analyzed baseline acoustic signature 139 (see FIG. 8), to the data processing system 100 (see FIG. 8) for processing, to obtain a processed baseline acoustic signature 140 (see FIG. 8). The step 76 of transmitting the baseline acoustic signature 136 (see FIG. 8) to the data processing system 100 (see FIG. 8) comprises transmitting the baseline acoustic signature 136 (see FIG. 8) via a communications network 164 (see FIG. 8). The communications network 164 may comprise a wired communications network 165 (see FIG. 8), or a wireless communications network 166 (see FIG. 8). As shown in FIG. 6, transmission via the communications network 164 from the acoustic signature health monitoring systems 90 is in the form of a wireless communications network 166.

As shown in FIG. 5, the method 70 further comprises step 78 of obtaining and analyzing with the acoustic signature health monitoring system 90 (see FIG. 8) off-board the UAV 10b (see FIG. 8), one or more subsequent acoustic signatures 142 (see FIG. 8) for each of the one or more sound producing structures 178 (see FIG. 8) of the UAV 10b (see FIG. 8). The step 78 of obtaining and analyzing the one or more subsequent acoustic signatures 142 (see FIG. 8) for each of the one or more sound producing structures 178 (see FIG. 8) of the UAV 10b (see FIG. 8) preferably comprises using the acoustic signature capture and monitoring subsystem 150 (see FIG. 8) and the analysis subsystem 160 (see FIG. 8), both of the acoustic signature health monitoring system 90 (see FIG. 8). As discussed above, the acoustic signature capture and monitoring subsystem 150 (see FIG. 8) is preferably configured to capture the one or more subsequent acoustic signatures 142 for the one or more sound producing structures 178 of the UAV 10b to obtain the one or more captured subsequent acoustic signatures 144 (see FIG. 8). As discussed above, the analysis subsystem 160 (see FIG. 8) is preferably configured to analyze the one or more captured subsequent acoustic signatures 144 (see FIG. 8) to obtain the one or more analyzed subsequent acoustic signatures 145 (see FIG. 8).

As shown in FIG. 5, the method 70 further comprises step 80 of transmitting with the acoustic signature health monitoring system 90 (see FIG. 8) each of the one or more subsequent acoustic signatures 142 (see FIG. 8), such as in the form of the one or more analyzed subsequent acoustic signatures 145 (see FIG. 8), to the data processing system 100 (see FIG. 8) for processing to obtain one or more processed subsequent acoustic signatures 146 (see FIG. 8). The step 80 of transmitting the one or more subsequent acoustic signatures 142 (see FIG. 8) to the data processing system 100 (see FIG. 8) comprises transmitting the one or more subsequent acoustic signatures 142 (see FIG. 8) via the communications network 164 (see FIG. 8). The communications network 164 may comprise the wired communications network 165 (see FIG. 8), or the wireless communications network 166 (see FIG. 8). As shown in FIG. 6, transmission via the communications network 164 from the acoustic signature health monitoring systems 90 is in the form of a wireless communications network 166.

The steps 76, 80 of transmitting the baseline acoustic signature 136 (see FIG. 8) and transmitting the one or more subsequent acoustic signatures 142 (see FIG. 8), respectively, to the data processing system 100 (see FIG. 8) may comprise transmitting the baseline acoustic signature 136 (see FIG. 8) and transmitting the one or more subsequent acoustic signatures 142 (see FIG. 8) to an onboard maintenance system 26a (see FIGS. 2, 8) onboard the UAV 10b (see FIG. 2), or to one or more downstream off-board systems 162 (see FIG. 8) off-board the UAV 10b (see FIG. 2). The onboard maintenance system 26a (see FIGS. 2, 8) may comprise a maintenance system log 28a (see FIGS. 2, 8) onboard the UAV 10b (see FIG. 2), or may comprise another suitable onboard maintenance system. The onboard maintenance system 26a is preferably configured to receive the transmitted baseline acoustic signature 136 (see FIG. 8), such as in the form of analyzed baseline acoustic signature 139 (see FIG. 8), and is further preferably configured to receive the transmitted one or more subsequent acoustic signatures 142 (see FIG. 8), such as in the form of one or more analyzed subsequent acoustic signatures 145 (see FIG. 8). For example, a data stream 168 (see FIG. 8), such as in the form of the analyzed baseline acoustic signature 139 analysis data, or such as in the form of the one or more analyzed subsequent acoustic signatures 145 analysis data, may be transmitted into the UAV 10b (see FIG. 2) wirelessly to be added to the maintenance system log(s) 28a (see FIGS. 2, 8).

The one or more downstream off-board systems 162 (see FIG. 8) may comprise an operations center 86 (see FIGS. 6, 8) for the UAV 10b (see FIG. 2), a maintenance depot 88 (see FIGS. 6, 8) for the UAV 10b (see FIG. 2), or another suitable downstream off-board system. The one or more downstream off-board systems 162 (see FIG. 8) are preferably configured to receive the transmitted baseline acoustic signature 136 (see FIG. 8), such as in the form of analyzed baseline acoustic signature 139 (see FIG. 8), and are further preferably configured to receive the transmitted one or more subsequent acoustic signatures 142 (see FIG. 8), such as in the form of one or more analyzed subsequent acoustic signatures 145 (see FIG. 8). For example, the data stream 168 (see FIG. 8), such as in the form of the analyzed baseline acoustic signature 139 analysis data, or such as in the form of the one or more analyzed subsequent acoustic signatures 145 analysis data, may be transmitted to the operations center 86 (see FIGS. 6, 8) for the UAV 10b (see FIG. 2) for analysis there, thus allowing the staging of equipment to perform maintenance checks while the UAV is in flight or en route, which may result in improving the time in service.

As shown in FIG. 5, the method 70 further comprises step 82 of comparing the processed baseline acoustic signature 140 (see FIG. 8) processed with the data processing system 100 (see FIG. 8), with the one or more processed subsequent acoustic signatures 146 (see FIG. 8) processed with the data processing system 100 (see FIG. 8), for each of the one or more sound producing structures 178 (see FIG. 8) of the UAV 10b (see FIG. 8), in order to detect any change 149 (see FIG. 8) in the processed baseline acoustic signature 146 (see FIG. 8) over time. A variety of known algorithms and analytical techniques may be used to compare the processed baseline acoustic signature 140 (see FIG. 8) with the one or more processed subsequent acoustic signatures 146 (see FIG. 8) to determine any change 149 in the processed baseline acoustic signature 149 (see FIG. 8).

In another embodiment of the disclosure, there is provided a system 68 (see FIG. 8) for health monitoring of an unmanned autonomous vehicle (UAV) 10b (see FIGS. 2, 8). FIG. 8 is an illustration of a block diagram illustrating an embodiment of the system 68 of the disclosure. As shown in FIG. 8, the system 68 comprises an acoustic signature health monitoring system 90 off-board the unmanned autonomous vehicle (UAV) 10b (see also FIG. 2). As shown in FIG. 8 and as discussed above, the acoustic signature health monitoring system 90 comprises the acoustic signature capture and monitoring subsystem 90 preferably configured to capture the baseline acoustic signature 136 (see FIG. 8) and the one or more subsequent acoustic signatures 142 (see FIG. 8) for one or more sound producing structures 178 (see FIG. 8) of the UAV 10b (see FIG. 2).

As shown in FIG. 8, the acoustic signature capture and monitoring subsystem 150 (see FIG. 8) comprises one or more microphones 152 and one or more audio recording devices 156 configured to capture the baseline acoustic signature 136 and the one or more subsequent acoustic signatures 142 for one or more sound producing structures 178 of the UAV 10b to obtain the captured baseline acoustic signature 136 and the one or more captured subsequent acoustic signatures 144.

As shown in FIG. 8, and as discussed above, the acoustic signature health monitoring system 90 further comprises the analysis subsystem 160, comprising a computing device 102a, which is preferably configured to analyze and transmit the baseline acoustic signature 136, such as in the form of captured baseline acoustic signature 138, and which is preferably configured to analyze and transmit the one or more subsequent acoustic signatures 142, such as in the form of one or more captured subsequent acoustic signatures 144. The analysis subsystem 160 (see FIG. 8) comprises a computing device 102 (see FIG. 7), such as in the form of analysis subsystem computing device 102a (see FIG. 8), which is preferably configured to perform a desired acoustic signature analyses on the baseline acoustic signature 136 (see FIG. 8), such as in the form of captured baseline acoustic signature 138 (see FIG. 8), to obtain the analyzed baseline acoustic signature 139 (see FIG. 8). The computing device 102 of the analysis subsystem 160 (see FIG. 8) is preferably further configured to perform a desired acoustic signature analyses on the one or more subsequent acoustic signatures 142 (see FIG. 8), such as in the form of one or more captured subsequent acoustic signatures 144 (see FIG. 8), to obtain the one or more analyzed subsequent acoustic signature 145 (see FIG. 8).

As shown in FIG. 8, and as discussed above, the acoustic signature health monitoring system 90 further comprises a power source 130 that provides power to the acoustic signature capture and monitoring subsystem 150 and to the analysis subsystem 160.

As shown in FIG. 8, the system 68 further comprises a data processing system 100 comprising a computing device 102b configured to receive and process the baseline acoustic signature 136, such as in the form of analyzed baseline acoustic signature 139, and configured to receive and process the one or more subsequent acoustic signatures 142, such as in the form of one or more analyzed subsequent acoustic signatures 145, to obtain a processed baseline acoustic signature 140 and to obtain one or more processed subsequent acoustic signatures 146, respectively. The data processing system 100 (see FIG. 8) is preferably configured to receive and process a data stream 168, such as in the form of the analyzed baseline acoustic signature 139, and such as in the form of the one or more analyzed subsequent acoustic signatures 145.

The data processing system 100 (see FIG. 8) compares the processed baseline acoustic signature 140 (see FIG. 8) with the one or more processed subsequent acoustic signatures 146 (see FIG. 8) for each of the one or more sound producing structures 178 (see FIG. 8) of the UAV 10b (see FIG. 8) to detect any change 149 (see FIG. 8) in the processed baseline acoustic signature 140 (see FIG. 8) over time, and in order to identify any defects 174 (see FIG. 8) and monitor a mechanical health 172 (see FIG. 8) of the one or more sound producing structures 178 (see FIG. 8) of the UAV 10b (see FIG. 8).

A communications network 164 (see FIG. 8) preferably enables electronic or digital communication between the acoustic signature health monitoring system 90 and the data processing system 100. The communications network 164 (see FIG. 8) may comprise the wired communications network 165 (see FIG. 8) or the wireless communications network 166 (see FIG. 8).

The processed baseline acoustic signature 140 (see FIG. 8) and the one or more processed subsequent acoustic signatures 146 (see FIG. 8) are preferably transmitted via the communications network 164 (see FIG. 8) to the onboard maintenance system 26a (see FIGS. 2, 8) onboard the UAV 10b (see FIG. 2), or to the one or more downstream off-board systems 162 (see FIG. 8) off-board the UAV 10b (see FIG. 2). As discussed above, the onboard maintenance system 26a (see FIGS. 2, 8) may comprise the maintenance system log 28a (see FIGS. 2, 8) onboard the UAV 10b (see FIG. 2), or may comprise another suitable onboard maintenance system. As discussed above, the one or more downstream off-board systems 162 (see FIG. 8) may comprise the operations center 86 (see FIGS. 6, 8) for the UAV 10b (see FIG. 2), the maintenance depot 88 (see FIGS. 6, 8) for the UAV 10b (see FIG. 2), or another suitable downstream off-board system.

In another embodiment of the disclosure, there is provided the acoustic signature health monitoring system 90 (see FIG. 8) off-board the unmanned autonomous vehicle (UAV) 10b (see FIG. 2). As discussed above, the acoustic signature health monitoring system 90 (see FIG. 8) comprises the acoustic signature capture and monitoring subsystem 150 (see FIG. 8) configured to capture the baseline acoustic signature 136 (see FIG. 8) and configured to capture the one or more subsequent acoustic signatures 142 (see FIG. 8), for the one or more sound producing structures 178 (see FIG. 8) of the UAV 10b (see FIG. 8). The sound producing structures 178 (see FIG. 8) of the UAV 10b (see FIGS. 2, 8) may comprise an engine 20a (see FIGS. 2, 8), a propeller 180 (see FIG. 8), a fuel pump 182 (see FIG. 8), a rotor 184 (see FIG. 8), an air conditioning system 186 (see FIG. 8), or another sound producing structure 178. The acoustic signature capture and monitoring subsystem 150 (see FIG. 8) comprises one or more microphones 152 (see FIG. 8) and one or more audio recording devices 156 (see FIG. 8).

The acoustic signature health monitoring system 90 further comprises the analysis subsystem 160 (see FIG. 8) comprising the analysis subsystem computing device 102a (see FIG. 8) configured to analyze and transmit the baseline acoustic signature 136 (see FIG. 8) and the one or more subsequent acoustic signatures 142 (see FIG. 8) to the data processing system 100 (see FIG. 8) for processing to obtain the processed baseline acoustic signature 140 and the one or more processed subsequent acoustic signatures 146 (see FIG. 8). Preferably, the baseline acoustic signature 136 (see FIG. 8) and the one or more subsequent acoustic signatures 142 (see FIG. 8) are transmitted to the data processing system 100 via the wired communications network 165 (see FIG. 8) or via the wireless communications network 166 (see FIG. 8). The data processing system 100 compares the processed baseline acoustic signature 140 with the one or more processed subsequent acoustic signatures 146 for each of the one or more sound producing structures 178 of the UAV 10b to detect any change 149 (see FIG. 8) in the processed baseline acoustic signature 140 (see FIG. 8) over time, in order to identify any defects 174 (see FIG. 8) and monitor a mechanical health 172 (see FIG. 8) of the one or more sound producing structures 178 (see FIG. 8) of the UAV 10b. The acoustic signature health monitoring system 90 (see FIG. 8) further comprises the power source 130 (see FIG. 8) providing power to the acoustic signature capture and monitoring subsystem 150 (see FIG. 8) and the analysis subsystem 160 (see FIG. 8).

The acoustic signature health monitoring system 90 (see FIG. 8) may be either portable or permanently installed at a desired location. Preferably, the acoustic signature health monitoring system 90 (see FIG. 8) is automated and is configured for an in-field set-up 84 (see FIG. 6).

Disclosed embodiments of the method 70 (see FIG. 5) and system 68 (see FIG. 8) provide numerous advantages over known methods and systems, including the capture of acoustic signatures 112 of the sound producing structures 178 of the UAV 10b by the acoustic signature health monitoring system 90 (see FIG. 6) off-board the UAV 10b, and the transmission of the acoustic signatures 112 back to the UAV 10b or to one or more downstream off-board systems 162 (see FIG. 8) for health monitoring and health management applications.

In addition, disclosed embodiments of the method 70 (see FIG. 5) and system 68 (see FIG. 8) provide for an automated detection and analysis system 68 (see FIG. 8) of possible engine 20a (see FIG. 2) or other machinery faults on UAVs 10b (see FIG. 2), or machinery, in their normal operational space through deployment of the acoustic signature health monitoring system 90 (see FIG. 6) in the field, which is not installed on the UAV 10b (see FIG. 2), or on the machinery being tested, and further provide for identification of equipment that may have a mechanical issue in an engine 20a (see FIG. 2) or other machinery before that issue manifests itself as a failure.

Moreover, disclosed embodiments of the method 70 (see FIG. 5) and system 68 (see FIG. 8) provide for a system 68 that does not require installing and certifying any new equipment or components on the UAV 10b (see FIG. 2) or other unmanned vehicle, and are usable across a range of air vehicles 10, including unmanned, manned, private, and commercial, as well as ground and water vehicles and machinery.

Further with the disclosed embodiments of the method 70 (see FIG. 5) and system 68 (see FIG. 8), by positioning the acoustic signature health monitoring system 90 (see FIG. 6) at desired locations, such as one of a launch site 94 (see FIG. 6), a taxiway 96 (see FIG. 6), a runway 98 (see FIG. 6), an air strip (not shown), a landing strip (not shown), an operations center 86 (see FIG. 6), a maintenance depot 88 (see FIG. 6), a factory (not shown), or another suitable location, the UAV 10b (see FIG. 2) may be monitored for anomalies that may be detected by slight changes in the acoustic signature 112 (see FIG. 8) of the moving parts, and that may not be detected via onboard sensors or maintenance checks until a more serious problem has developed. Using high quality microphones, such as directional microphones 152a (see FIG. 8) and a digitizing and sampling computing device 102 (see FIG. 7), one can capture or record the audio data or sounds produced by the sound producing structures 178 (see FIG. 8) or machinery and perform the necessary analysis. In particular, one may analyze the acoustic signature(s) 112 (see FIG. 8) and detect features of the analysis that are out of the ordinary for how the sound producing structures 178 (see FIG. 8) or machinery should sound.

Further, disclosed embodiments of the method 70 (see FIG. 5) and system 68 (see FIG. 8) may decrease costs over known onboard health monitoring systems, since the acoustic signature health monitoring system 90 (see FIG. 6) is off-board the UAV 10b, and may maximize utilization at desired locations where UAVs pass, i.e., launch sites, runways, taxiways, etc., as there is an opportunity to regularly monitor and analyze the acoustic signature(s) 112 (see FIG. 8) of the UAV components as the UAV 10b may be in operation day to day as it passes through the launch sites, runways, taxiways, and other desired locations. In addition, for use with remotely launched and captured UAVs, especially in military environments, no certification would be needed, and for UAV monitoring at remote or temporary launch sites, additional health monitoring equipment does not need to be deployed on site which may increase the UAV total installation. Moreover, providing in-field monitoring systems for UAVs may provide additional abilities to test and report on UAV health status and manage UAV health maintenance.

Finally, disclosed embodiments of the method 70 (see FIG. 5) and system 68 (see FIG. 8) provide a database of acoustic signatures 112 (see FIG. 8) against which subsequent acoustic signatures 142 (see FIG. 8) of the UAV 10b may be compared, and the UAVs 10b may be deployed in a more controlled noise environment or a quieter, more remote environment, so the acoustic signatures 112 (see FIG. 8) may be more easily captured or recorded without additional noise interference such as may be heard at commercial airports.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method for acoustic signature health monitoring of an unmanned autonomous vehicle (UAV), the method comprising the steps of:

positioning an acoustic signature health monitoring system proximate to and off-board an unmanned autonomous vehicle (UAV) to be monitored for mechanical health of one or more sound producing structures of the UAV;

obtaining and analyzing with the acoustic signature health monitoring system off-board the UAV a baseline acoustic signature for each of the one or more sound producing structures of the UAV;

transmitting with the acoustic signature health monitoring system each baseline acoustic signature to a data processing system for processing;

obtaining and analyzing with the acoustic signature health monitoring system off-board the UAV one or more subsequent acoustic signatures for each of the one or more sound producing structures of the UAV;

transmitting with the acoustic signature health monitoring system each of the one or more subsequent acoustic signatures to the data processing system for processing; and, comparing the processed baseline acoustic signature with the one or more processed subsequent acoustic signatures for each of the one or more sound producing structures of the UAV, in order to detect any change in the processed baseline acoustic signature over time.

2. The method of claim 1 wherein the step of positioning the acoustic signature health monitoring system comprises positioning the acoustic signature health monitoring system proximate to and off-board the UAV at a location comprising one of a launch site, a taxiway, a runway, an air strip, a landing strip, a terminal, an operations facility, a maintenance facility, and a factory.

3. The method of claim 1 wherein the step of positioning the acoustic signature health monitoring system comprises positioning a portable acoustic signature health monitoring system, or positioning a permanent acoustic signature health monitoring system.

4. The method of claim 1 wherein the steps of obtaining and analyzing comprise using an acoustic signature capture and monitoring subsystem and an analysis subsystem, both of the acoustic signature health monitoring system, to obtain and analyze the baseline acoustic signature and the one or more subsequent acoustic signatures.

5. The method of claim 4 wherein the acoustic signature capture and monitoring subsystem comprises one or more microphones and one or more audio recording devices to capture and record the baseline acoustic signature and the one or more subsequent acoustic signatures.

6. The method of claim 5 wherein the analysis subsystem comprises a computing device to analyze the captured baseline acoustic signature and the captured one or more subsequent acoustic signatures, and to transmit the analyzed baseline acoustic signature and the analyzed one or more subsequent acoustic signatures to the data processing system.

7. The method of claim 1 wherein the steps of obtaining and analyzing comprise obtaining and analyzing the baseline acoustic signature and the one or more subsequent acoustic signatures for one or more sound producing structures comprising an engine, a propeller, a fuel pump, a rotor, and an air conditioning system.

8. The method of claim 1 wherein the steps of transmitting the baseline acoustic signature and the one or more subsequent acoustic signatures to the data processing system comprise transmitting via a wired communications network or a wireless communications network.

9. The method of claim 1 wherein the steps of transmitting to the data processing system comprise transmitting the baseline acoustic signature and the one or more subsequent acoustic signatures to an onboard maintenance system comprising a maintenance system log onboard the UAV, or to a downstream off-board system comprising an operations center for the UAV or a maintenance depot for the UAV.

10. A system for health monitoring of an unmanned autonomous vehicle (UAV), the system comprising:

an acoustic signature health monitoring system off-board an unmanned autonomous vehicle (UAV), the acoustic signature health monitoring system comprising:
an acoustic signature capture and monitoring subsystem configured to capture a baseline acoustic signature and one or more subsequent acoustic signatures for one or more sound producing structures of the UAV;
an analysis subsystem configured to analyze and transmit the baseline acoustic signature and the one or more subsequent acoustic signatures;
a power source providing power to the acoustic signature capture and monitoring subsystem and the analysis subsystem; and, a data processing system comprising a computing device configured to receive and process the baseline acoustic signature and the one or more subsequent acoustic signatures to obtain a processed baseline acoustic signature and one or more processed subsequent acoustic signatures, wherein the data processing system compares the processed baseline acoustic signature with the one or more processed subsequent acoustic signatures for each of the one or more sound producing structures of the UAV to detect any change in the processed baseline acoustic signature over time, in order to identify any defects and monitor a mechanical health of the one or more sound producing structures of the UAV.

11. The system of claim 10 wherein the acoustic signature capture and monitoring subsystem comprises one or more microphones and one or more audio recording devices configured to capture the baseline acoustic signature and the one or more subsequent acoustic signatures for the one or more sound producing structures of the UAV.

12. The system of claim 10 wherein the analysis subsystem comprises an analysis subsystem computing device configured to perform a desired acoustic signature analyses on the baseline acoustic signature and the one or more subsequent acoustic signatures.

13. The system of claim 10 wherein the acoustic signature health monitoring system comprises a portable acoustic signature health monitoring system or comprises a permanent acoustic signature health monitoring system.

14. The system of claim 10 wherein the one or more sound producing structures comprise an engine, a propeller, a fuel pump, a rotor, and an air conditioning system.

15. The system of claim 10 wherein the processed baseline acoustic signature and the one or more processed subsequent acoustic signatures are transmitted via a communications network to an onboard maintenance system comprising a maintenance system log onboard the UAV, or to a downstream off-board system comprising an operations center for the UAV or a maintenance depot for the UAV.

16. An acoustic signature health monitoring system off-board an unmanned autonomous vehicle (UAV), the system comprising:

an acoustic signature capture and monitoring subsystem configured to capture a baseline acoustic signature and configured to capture one or more subsequent acoustic signatures, for one or more sound producing structures of an unmanned autonomous vehicle (UAV), the acoustic signature capture and monitoring subsystem comprising:
one or more microphones; and,
one or more audio recording devices;
an analysis subsystem comprising an analysis subsystem computing device configured to analyze and transmit the baseline acoustic signature and the one or more subsequent acoustic signatures to a data processing system for processing to obtain a processed baseline acoustic signature and one or more processed subsequent acoustic signatures, wherein the data processing system compares the processed baseline acoustic signature with the one or more processed subsequent acoustic signatures for each of the one or more sound producing structures of the UAV to detect any change in the processed baseline acoustic signature over time, in order to identify any defects and monitor a mechanical health of the one or more sound producing structures of the UAV; and, a power source providing power to the acoustic signature capture and monitoring subsystem and the analysis subsystem.

17. The system of claim 16 wherein the system is either portable or permanently installed at a desired location.

18. The system of claim 16 wherein the system is automated and is configured for an in-field set-up.

19. The system of claim 16 wherein the baseline acoustic signature and the one or more subsequent acoustic signatures are transmitted to the data processing system via a wired communications network or a wireless communications network.

20. The system of claim 16 wherein the one or more sound producing structures comprise an engine, a propeller, a fuel pump, a rotor, and an air conditioning system.

* * * * *